(12) United States Patent
Belkin et al.

(10) Patent No.: US 7,477,893 B2
(45) Date of Patent: Jan. 13, 2009

(54) ON HOLD CALL RETRIEVAL AND ROUTING

(75) Inventors: Anatoly S. Belkin, Glenview, IL (US); Alex P. Hirsbrunner, Bloomingdale, IL (US); Josheph Hoshen, Naperville, IL (US); Jennnifer A. Pierc, Algongquin, IL (US); Niranjan N Segal, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 76 days.

(21) Appl. No.: 10/727,433

(22) Filed: Dec. 4, 2003

(65) Prior Publication Data

US 2005/0124326 A1      Jun. 9, 2005

(51) Int. Cl.
*H04M 3/42* (2006.01)

(52) U.S. Cl. .................. 455/417; 455/445; 455/436; 455/416; 379/211.01; 370/331; 370/338

(58) Field of Classification Search .......... 455/552.1, 455/445, 426.1, 432.1, 435.1, 414.1, 436–442, 455/554–555, 412.1, 417, 416; 370/331–333, 370/338, 260; 379/211.01, 265.01, 266.01
See application file for complete search history.

(56) References Cited

U.S. PATENT DOCUMENTS

| | | | | |
|---|---|---|---|---|
| 5,436,967 A | * | 7/1995 | Hanson | 379/210.01 |
| 5,764,746 A | * | 6/1998 | Reichelt | 379/210.01 |
| 5,913,166 A | * | 6/1999 | Buttitta et al. | 455/436 |
| 5,970,134 A | * | 10/1999 | Highland et al. | 379/265.02 |
| 6,031,905 A | | 2/2000 | Furman et al. | 379/201 |
| 6,138,030 A | * | 10/2000 | Coombes et al. | 455/507 |
| 6,327,363 B1 | * | 12/2001 | Henderson et al. | 379/265.01 |
| 6,374,102 B1 | * | 4/2002 | Brachman et al. | 455/422.1 |
| 6,633,635 B2 | * | 10/2003 | Kung et al. | 379/215.01 |
| 6,650,908 B1 | * | 11/2003 | Coombes et al. | 455/560 |
| 6,654,615 B1 | * | 11/2003 | Chow et al. | 455/555 |
| 6,799,040 B2 | * | 9/2004 | Foster et al. | 455/436 |
| 6,816,469 B1 | * | 11/2004 | Kung et al. | 370/260 |
| 6,816,583 B2 | * | 11/2004 | Roeder | 379/212.01 |
| 6,871,070 B2 | * | 3/2005 | Ejzak | 455/435.1 |
| 7,003,298 B1 | * | 2/2006 | Jagadeesan | 455/442 |
| 7,209,475 B1 | * | 4/2007 | Shaffer et al. | 370/355 |
| 2003/0003915 A1 | * | 1/2003 | Foster et al. | 455/442 |
| 2003/0134638 A1 | * | 7/2003 | Sundar et al. | 455/435 |
| 2005/0119005 A1 | * | 6/2005 | Segal et al. | 455/445 |

* cited by examiner

*Primary Examiner*—Sharad Rampuria

(57) ABSTRACT

A wireless communication unit (101, 200, 401), network switch (112, 300, 407) and corresponding methods facilitate retrieval, routing, and management of on-hold calls (FIG. 4-FIG. 7) within a first communication network (103) when the unit is operating in a second communication network (105) that is loosely coupled to the first. The communication unit comprises a transceiver (203) configured to support an air interface with the first and the second communication network; and a controller (209) arranged to cooperatively operate with the transceiver to retrieve an on-hold call from the first network via a call leg established to support a handout to and while the unit is operating in the second network. A user interface (211) and in band signaling over the call leg facilitates management, connecting, disconnecting, etc., of the on-hold calls by the communication unit.

4 Claims, 7 Drawing Sheets

ON HOLD CALL RETRIEVAL AND ROUTING

FIELD OF THE INVENTION

The present invention relates in general to communication units and networks, and more specifically to methods and apparatus to facilitate on hold call retrieval and routing for communication units operating within such networks.

BACKGROUND OF THE INVENTION

Wireless Local Area Networks (WLANs) are being contemplated or are known. Voice services in WLANs are typically supported by WLAN servers that may be referred to as private branch exchanges (PBXS) or enterprise servers. The PBX normally provides a control and switching function for the WLAN and communication units operating therein or users thereof. The WLAN can be an attractive and inexpensive alternative for typical voice services such as telephony or dispatch services and may provide additional amenities such as high-speed wireless Internet and Intranet access as well as other real-time applications that may be more specific to a given enterprise.

Wireless wide area networks (wireless WANs or WANs), such as conventional cellular telephone systems, are also known. Such networks provide the advantage of wide area coverage but may not be economically attractive for routine access to wideband or high speed data capabilities, such as are required for certain Internet or Intranet applications. Nevertheless a communication unit that is operating on a WLAN may move beyond the effective service area for the WLAN and thus need support or services from a WAN. In situations, sometimes referred to as loosely coupled systems, where the WAN is indirectly coupled to the WLAN via the public switched telephone network (PSTN) or communication unit operating thereon this can present problems, particularly for on-hold calls within the WLAN after a handoff or handover (hand out) of a communication unit to the WAN. Current practice in such loosely coupled systems is to disconnect the on-hold calls or route them to voice mail. In either event the call is no longer available to the communication unit or user thereof, thus contributing to inconvenience and lack of satisfaction.

Therefore, a need exists for methods and apparatus to facilitate on hold call retrieval and routing for communication units operating within such loosely coupled communications networks

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

Figure 1:
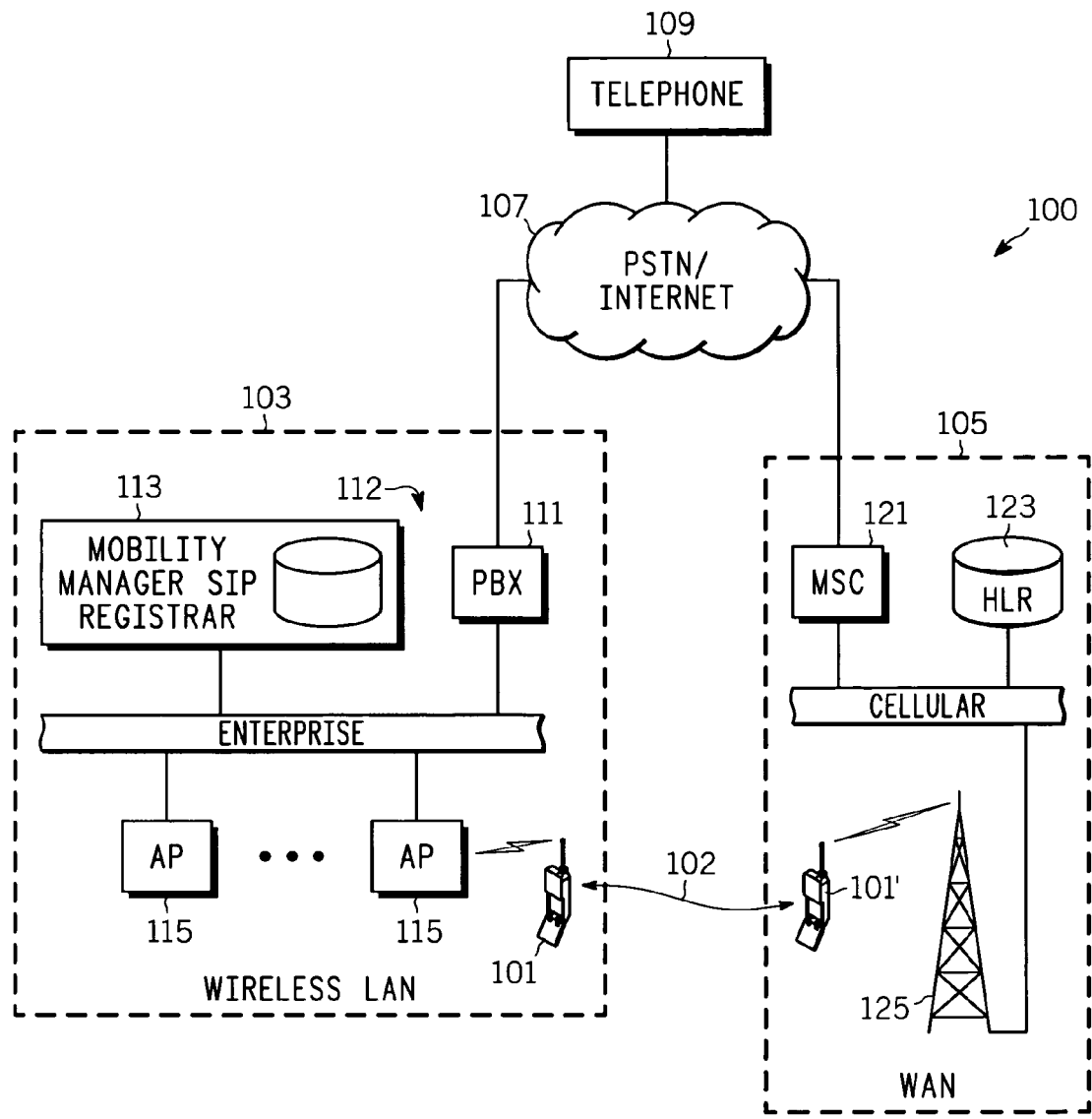
FIG. 1 depicts, in a simplified and representative form, an exemplary system diagram for a loosely coupled communication network where methods and apparatus facilitating the retrieval and routing of on-hold calls can be advantageously utilized.

In overview, the present disclosure concerns wireless communication devices or units, often referred to as communication units, such as portable or cellular phones or handsets or two-way radios and the like and communication networks or systems that provide services such as voice and data communication services to or for such communication units. More particularly various inventive concepts and principles are embodied in loosely coupled communication systems or constituent elements, communication units, and methods therein for routing or retrieving and managing on-hold calls for the communication unit as the unit moves from a first communication network to a second communication network. Note that "wireless communication unit" may be used interchangeably herein with "communication unit", "communication device" or "unit" and each of these terms denotes a device ordinarily associated with a user and typically a wireless communication unit that can be used with a public network as well as a private or enterprise network. Examples of such units include personal digital assistants, personal computers equipped for wireless operation, a cellular handset or device, or equivalents thereof provided such units are arranged and constructed for operation in different networks.

The communication systems or networks and communication units that are of particular interest are those that may provide or facilitate voice communication services or data or messaging services over cellular wide area networks (WANs), such as conventional two way systems and devices, various cellular phone systems including analog and digital cellular, CDMA (code division multiple access) and variants thereof, GSM, GPRS (General Packet Radio System), 2.5G and 3G systems such as UMTS (Universal Mobile Telecommunication Service) systems, 4G OFDM systems, integrated digital enhanced networks and variants or evolutions thereof. Furthermore the wireless communication units or devices of particular interest have short range wireless communication capability normally referred to as wireless local area network (wireless LAN or WLAN) capabilities based on standards such as IEEE 802.11, Bluetooth, or Hiper-Lan and the like that preferably utilize CDMA, frequency hopping, OFDM or TDMA access technologies and one or more of various networking protocols, such as TCP/IP (Transmission Control Protocol/Internet Protocol), UDP/IP (User Datagram Protocol/IP), IPX/SPX (Inter-Packet Exchange/Sequential Packet Exchange), Net BIOS (Network Basic Input Output System) or other protocol structures.

As further discussed below various inventive principles and combinations thereof are advantageously employed to facilitate management, routing, or retrieval of one or more on-hold calls from a first wireless communication network (first communication network or first network) to provide these on-hold calls to the communication unit while operating in a second wireless communication network (second communication network or second network). This is facilitated by automatically routing the on-hold calls over a call leg used to effect a handout of an ongoing call when the wireless communication unit moved to the second network or routing the on-hold calls responsive to in-band signaling. In this manner, advantageously on-hold calls may be routed to the communication unit without dropping the on-hold call or otherwise not making the on-hold call available in a loosely coupled system, e.g. where the second network is not aware of the first network, since the first and second network are only coupled via the PSTN and use only conventional wired telephony protocols to communicate.

The instant disclosure is provided to further explain in an enabling fashion the best modes of performing one or more embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processors or general purpose processors and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, an exemplary and representative environment or system diagram for a loosely coupled communication network 100 where methods and apparatus facilitating the retrieval and routing of on-hold calls can be advantageously utilized will be discussed and described. In one embodiment one or more calls have been placed on-hold by the communication unit in a first network, such as a wireless LAN, a corresponding wireless communication unit has been handed out to a second network (now operating in the second network), and the on-hold calls need to be made available to the communication unit in the second network. The diagram of FIG. 1 generally shows a communication unit 101 that is portable or mobile and that can move (depicted generally by arrow 102 and communication unit 101') throughout a service area of a first wireless communication network (first network) 103 and a service area for a second wireless communication network (second network) 105. Note that in practical systems there may be a multiplicity of such wireless communication units where for the sake of simplicity one has been depicted.

In this exemplary embodiment, the first network 103 is or includes a wireless local area network (WLAN) using packet data based methodologies including VoIP and the second network 105 is, in one embodiment, a WAN, such as a cellular voice or packet data network or other cellular or cellular like network otherwise referred to as a cellular WAN or simply WAN. While the arrow 102 and alternative location for wireless communication unit designated 101' suggest physical movement, this may not be the case since the WAN likely has overlapping coverage with the wireless LAN. The arrow may simply denote a change in which network the communication unit is operating or registered on for a variety of reasons. The first communication network or wireless LAN is inter coupled to the second communication network as well as other communication devices such as plain old telephone set (POTS) 109 or IP phones by a public network, such as the public switched telephone network or Internet 107.

The first network 103 in the wireless LAN embodiment includes a communications network switch 112 comprising in certain embodiments a switching function 111 that may alternatively be referred to as Private Branch Exchange (PBX), enterprise server, media gateway controller (MGC) and so on and a mobility manager 113. The PBX 111 and mobility manager 113 are inter coupled via the Enterprise infrastructure or wired portion of the LAN as well as further coupled to a plurality of access points 115. The access points support the wireless LAN air interface with the wireless communications units using, as noted earlier, a known protocol and associated techniques, such as one or more IEEE 802.11 protocols.

The first network 103 in one or more embodiments further relies on and utilizes an application level protocol for managing connections or sessions between the various network entities. This protocol in one embodiment is a known Session Initiation Protocol (SIP) but other similar protocols, such as H.323, with similar functionality could be used. The protocol, known as H.323, is defined and promulgated by the International Multimedia Telecommunication Consortium (IMTC) (see http://www.imtc.org/h323.htm and associated websites for descriptive documents). The Session Initiation Protocol (SIP) is defined by the Internet Engineering Task Force (IETF) in a document designated RFC3261. Much of the discussion below, where relevant will assume that SIP and SIP constructs and entities are being utilized in the WLAN and that legacy cellular or dispatch protocols are being utilized in the WAN, where it is understood that similar functions and methods are available using other protocols if desired.

The mobility manager 113 includes, in the SIP embodiment, a known SIP Registrar, SIP Proxy, etc. The mobility manager 113 is responsible for maintaining network contact information (sometimes referred to as location information) for the various wireless communication units and thus is utilized by network entities as a central point for setting up connections or sessions with other network entities. The mobility manager will be described in further detail below with reference to FIG. 3.

The second network or WAN 105 includes a network switching function 121, alternatively referred to as a mobile switching center (MSC). The MSC is coupled to a home location registrar (HLR) 123 and numerous base transmitter sites (BTS) 125 all as known. The MSC 121 further comprises a visitors location registrar (VLR not specifically shown) as is known. The BTS 125 supports the air interface with the wireless communication units, such as unit 101', when that unit is in the coverage area of and operating on the second network. Note that first and second networks will be used in the description but these terms may be interchanged, e.g. the first network could be a WAN and the second network a WLAN, or both could be WLANs for example, provided the appropriate functionality is available within such networks.

Also it will be appreciated that other entities or functions that are part of typical networks are not specifically shown but understood to be present and operational. For example in the first network 103 or WLAN, in addition to a multiplicity of Access Points 115 supporting wireless links with wireless communication units and thereby coupling the units to the balance of the network or enterprise network, other typical network routing equipment such as servers, concentrators, routers, etc. may be present. The second network or wireless WAN (hereafter WAN) similarly typically includes a plurality of base transmitters and antenna towers as well as base site controllers that all serve to provide a radio access network for communication units as well as the various registrars, billing servers and so forth. Note that while the first and second networks 103, 105 are referred to as wireless networks, much of these networks or the respective elements thereof are inter coupled using terrestrial based links, e.g. cables or wires. For example, the switching functions 1 12, 121 are normally coupled to the balance of their respective networks using known cables or wires. Furthermore the WLAN 103 can include and support voice services for stationary or static communications units that are coupled to the network using conventional cabling or wires. Thus the discussions below may refer alternatively to the first communications network 103 as a WLAN or LAN.

With this network architecture where the networks are loosely coupled and thus the WAN is not aware of the wireless LAN, problems associated with handling, routing or retrieving on-hold or call waiting calls are presented. These issues are compounded by other factors such as the ability to place different numbers of calls on hold in a typical wireless LAN than can be placed on hold in a typical WAN. For example a multiplicity, such as four, calls can be placed on hold in some embodiments of a wireless LAN whereas a typical WAN allows only two call appearances, e.g. an active call and an on-hold call or two on-hold calls. With this network discussion and description, the balance of these discussions will be devoted to various advantageous and inventive concepts and principles embodied as one or more apparatus and methods for resolving various of these issues.

Figure 2:
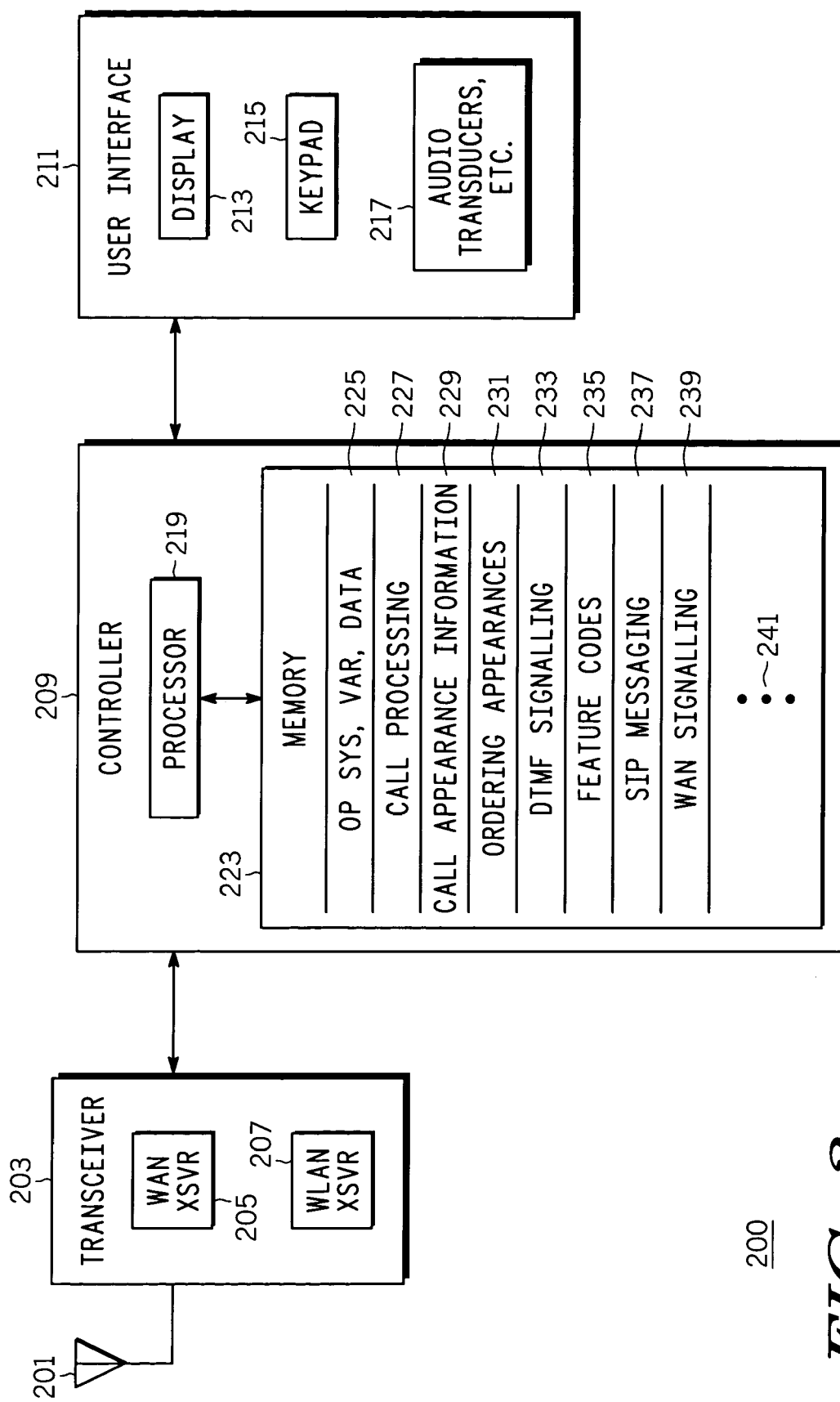
FIG. 2 depicts a simplified block diagram of a wireless communication unit arranged for facilitating the retrieval of on-hold calls in the system of FIG. 1.

Referring to FIG. 2 a simplified block diagram of a wireless communication unit, similar to communication unit 101 arranged for facilitating the retrieval of on-hold calls in the system of FIG. 1 will be discussed and reviewed. The communication unit 200 is structurally similar or identical to communication units, such as wireless handsets, available from manufacturers like Motorola, however the functionality of these conventional units is modified according to the principles and concepts disclosed and described herein in order to enjoy the advantages noted. The communication unit includes an antenna 201 coupled to a transceiver 203. The transceiver 203 is composed of at least one transmitter/receiver but may as depicted be comprised of one or more WAN transceivers 205 (one shown) and one or more additional wireless LAN transceivers 207 (one shown). In one embodiment, one transmitter/receiver 205 is for communicating over a wide area network (WAN) while another transmitter/receiver 207 is for communicating over a wireless LAN. These transceivers and their functionality are generally known and whether embodied as one or several transceivers will depend on technologies employed as well as the air interface technologies utilized in the specific WANs and LANs that the communication unit is configured to interface to or interact with.

The transceiver 203 is coupled to a controller 209 and the controller is further coupled to a user interface 211. The controller 209 provides over all control for the communication unit, call processing, and interfacing tasks associated with the transceivers and user interface. The user interface includes a conventional display 213, a keyboard or keypad 215, audio transducers 217, and the like. The controller 209 further comprises a processor 219 and a memory for storing software instructions and other information and data, the memory and processor inter coupled as depicted, as well as likely other known but irrelevant functionality. The processor is comprised of one or more general purpose processors and digital signal processors available from various suppliers, including Motorola. The memory 223 can include both volatile and non-volatile memory and can be at least in part integral to the processor 219 or may also be external to the processor.

The memory includes various software routines or programs and data including an operating system with variables and data 225 that when executed by the processor results in the controller performing the above generally identified duties as well as those tasks described below in conjunction with other routines. The other routines or programs include call processing routines 227 that are generally known and will vary with the specific requirements of the networks that are being utilized for service. Other routines and databases will be listed and their respective functionality will become evident with the detailed explanations below. These routines include call appearance information 229, a routine for ordering the call appearance information 231, in-band or DTMF signaling routines 233, feature codes listing and operational routines 235, SIP messaging routines 237 for use, for example, in the wireless LAN, WAN signaling routines 239 for use while operating in the WAN, and various other routines and databases 241, such as phone books, user interface drivers, and various applications, that are not specifically shown and in many instances not further relevant but that will be evident to one of ordinary skill.

In operation, the communication unit 101, 200, as discussed above, is capable of and arranged and constructed for operating on or operation within a loosely coupled communication network comprising multiple communication networks, such as wireless LAN 103 and wireless WAN 105. The wireless communication unit comprises the transceiver 203 that is configured to support an air interface with a first communication network e.g. wireless LAN 103 and an air interface with a second communication network, e.g. WAN 105. Furthermore the communication unit comprises the controller 209 that is arranged to control and cooperatively operate with the transceiver to retrieve an on-hold call from the first communication network after a handout to and while the wireless communication unit is operating in the second communication network. For example, the wireless communication unit, specifically the controller cooperatively with the transceiver is operable to communicate over a call leg between the second communications network and the first communications network and the on-hold call is coupled to the transceiver over the call leg. Note that this call leg can be a call leg set up to facilitate a hand out of an active call when the communication unit moved to the second network or alternatively can be another call leg set up to facilitate on-hold call coupling, retrieval or routing to the wireless communication unit via the second network.

In the former call leg embodiment, the controller cooperatively with the transceiver is operable to one of i) disconnect and ii) place on-hold the active call over the call leg and then connect the on-hold call (previously on-hold call is now active call), where the on-hold call is coupled from the first communication network to the wireless communication unit via the second communication network over the call leg. Note that the on-hold call can be automatically coupled or connected to the wireless communication unit over this call leg responsive to the disconnecting or placing on hold the active call or it can be connected to the wireless communication unit responsive to a novel form of in-band signaling, such as DTMF signaling using the DTMF routines 233, that is provided to the first communication network by the controller 209 in cooperation with the transceiver 203. In the latter call leg embodiment, often referred to as dialing out on-hold calls where a call leg is established or set up for forwarding on-hold calls, basically as new calls, the on-hold call can be automatically coupled or forwarded to the wireless communication unit via the WAN or second network so long as the number of call appearances supported by the WAN are not exceeded and alternatively coupled or forwarded responsive to disconnecting or placing on-hold an active call on the other (hand out) call leg. Of course the novel form of in-band signaling can also be used on the (dialed out) call leg to initiate forwarding or connecting the on-hold calls to the wireless communication unit.

In those embodiments employing or using in-band signaling the controller cooperatively with the transceiver can utilize the in-band signaling to provide a code, for example a feature code 235 from the memory 223, to the first communication network where the code connects an on-hold call, disconnects an active call, or places an active call on-hold. Note that an on-hold call that has been connected and after being connected is in actuality an active call. In further embodiments the on-hold call can be a plurality of on-hold calls, for example, four on-hold calls in some versions of the wireless LAN 103. In these situations the controller cooperatively with the transceiver is operable or can operate to one connect, disconnect, or place back on-hold one of the plurality of on-hold calls and then receive or be connected to a second of the plurality of on-hold calls until all of the plurality of on-hold calls have been disconnected. This is done by, for example, the controller cooperatively with the transceiver using in-band signaling to provide unique codes to the first communication network where the unique codes includes a code or unique one of the feature codes corresponding to each of the plurality of on-hold calls and these unique codes can be used to connect a selected one of each of the plurality of on-hold calls. Furthermore in one or more embodiments, the controller cooperatively with the transceiver uses the in-band signaling to provide one of the unique codes to disconnect the active call or provide another one of the unique codes to place the active call on-hold.

One embodiment uses codes or feature codes that are based on normal DTMF tones. Naturally the wireless communication unit 101 and first communication network, wireless LAN 103, or network switch 112 will have to use the same codes in order to properly coordinate the requests of the user and the actions or processes implemented by the wireless LAN 103. The LAN 103 or switch 112 will need to decode these DTMF codes. The in-band signaling in some embodiments amounts to over dialing the proper DTMF code on the existing call leg and possibly properly muting at either end to avoid annoyances for users. DTMF signaling may be particularly advantageous where the first and second networks, wireless LAN 103 and WAN 105 are inter coupled via the PSTN 107, since all equipment suitable for supporting this PSTN interface will also be configured to handle DTMF signaling. Other forms of signaling including proprietary forms or perhaps even SIP packet data could also be utilized provided both the network and the communication unit were arranged to provide and understand the indicated or desired functionality of such signaling. In any event a useful embodiment would need at least one feature code and when this is sent and detected could be used to connect an on-hold call including when needed placing an active call on hold. A more expansive embodiment has been proposed where one code exists for placing an active call on hold, one for disconnecting the active call, and then one code for each on-hold call that needs to be uniquely identified. One version of such codes would correspond to predetermined DTMF tone sequences corresponding to feature codes, such as the DTMF tone pattern that is generated when a *0 through *5 is utilized, with *0 indicating a disconnect for the active call, *5 indicating placing the active call on hold, and *1 through *4 indicating respectively on-hold calls 1 through 4. Of course other and more complex or extensive DTMF tone patterns can be used with the choice left to the practitioner. Considerations for selecting proper DTMF tone sequences include the reliability of the resultant signaling in terms of detect rates, false detect rates, including cross false detects or mistakes associated with detecting one DTMF tone sequence when another was sent. Furthermore it may be appropriate to provide for an acknowledgment message in order to further improve reliability of these signaling techniques. One of ordinary skill will be prepared to experimentally arrive at proper DTMF tone sequences.

Using these approaches the wireless communication unit, specifically the user interface 211 that is coupled to the controller can be employed and operate to indicate to the controller when to disconnect the active call, place the active call on-hold, or select the on-hold call that will be connected. Further more the user interface can be used to implement functionality such as select a next on-hold call to be connected or select a previous on-hold call to be connected. The respective codes can be correlated to different keys on a keypad or combination of keys. For example a hold key could be activated to send a *5 and an end key to send a *0. A talk key as is found on many portable communications units could be activated to either send a feature code corresponding to a selected on-hold call or send the next sequential feature code thus placing the present active call on hold and connecting the next on-hold call, where next would be determined by incrementing the last used code of *1-*3. Decrementing *2-*4 would allow for selecting a previous on-hold call, namely calls corresponding to *1 through *3. Other combinations of keys can be used for other user activated features all using combinations of these or other feature codes.

A further issue that will need to be considered is synchronizing the wireless communication unit and the network switch 112 as to what feature code is assigned to what on-hold call. Note that some feature codes, such *0 and *5 have predetermined meanings, e.g. disconnect and place on hold, that are not a function of the call that is on hold. Once that is done the user interface can be used or will be operable to select and indicate to the controller which of the plurality of on-hold calls will be connected. One inventive and advantageous approach is using the controller to recall from the call appearance information 229 in memory a call identifier, e.g. caller ID or calling party number corresponding to each of the calls that were placed on hold in the first communication network. Note that this information will be available to the communication unit when operating in the wireless LAN 103 before it is handed out to the WAN 105. This call appearance information or caller ID can then be ordered or sorted by the controller using the ordering appearances routines 231 in some predetermined manner, such as increasing or decreasing magnitude of the numbers. Once the controller has ordered or sorted the on-hold calls in this manner, the code or feature code corresponding to each of the plurality of on-hold calls can be assigned according to the order, for example *1 is assigned to the first on-hold call as ordered, *2 to the second ordered on-hold call and so forth. This assignment method will need to be practiced and implemented at both the wireless communication unit and wireless LAN or network switch and will need to remain constant so long as there are still on-hold calls, unless some form of reassignment is agreed upon at the wireless communication unit and the wireless LAN network switch. Thus with this approach to assigning feature codes to on-hold calls the first communication network and the wireless communication unit will be referring to the same on-hold call with a corresponding unique code and the user interface will also be able to present appropriate on-hold call information to a user. Note also that a common algorithm can be used to assign feature codes to calls as they are put on hold, so long as the algorithm is one that both the network switch and wireless communication unit can consistently implement.

Figure 3:
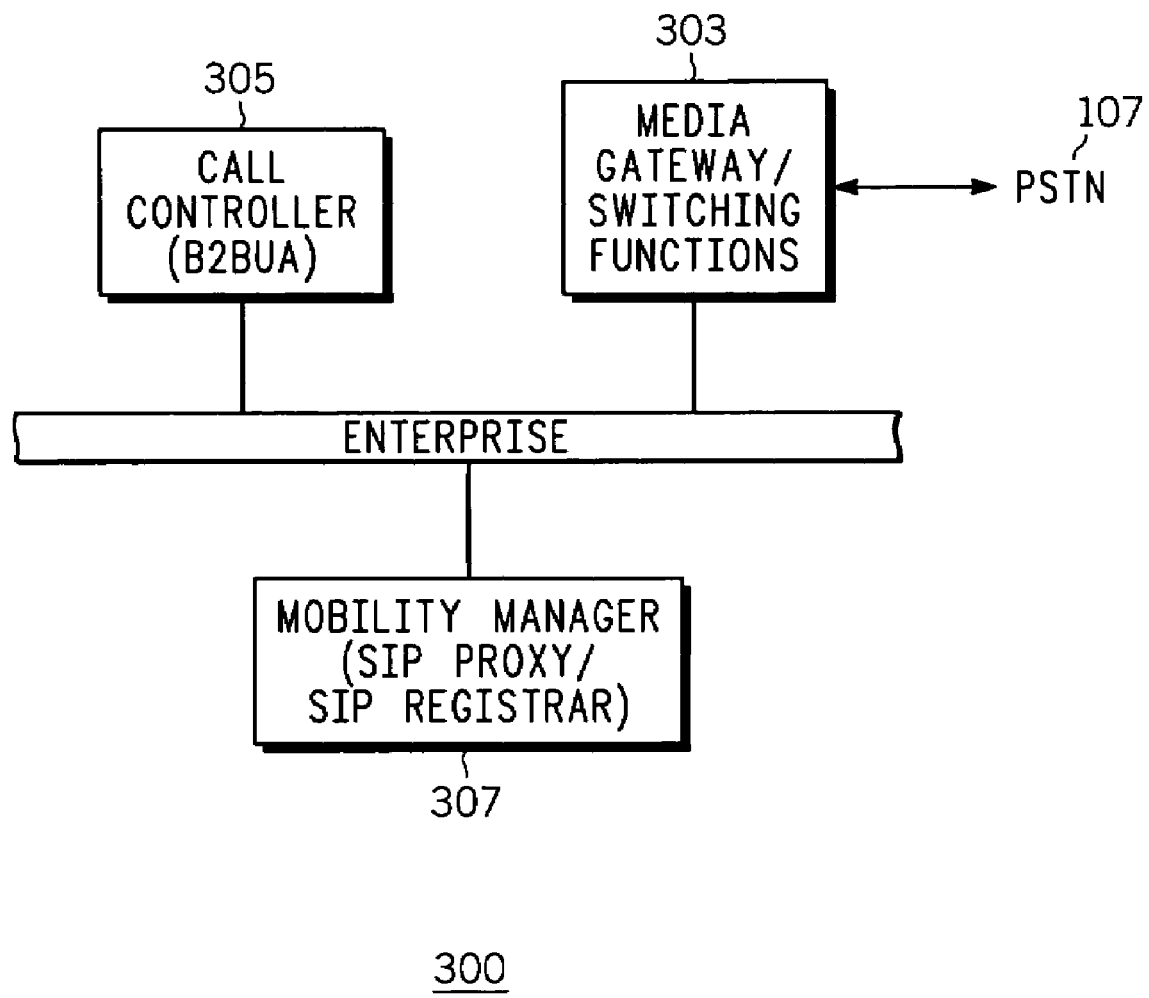
FIG. 3 is a simplified block diagram of a network switch that is arranged for routing on-hold calls in the system of FIG. 1.

Referring to FIG. 3, a simplified block diagram of a communication network switch 300, such as the network switch 112, that is arranged for routing on-hold calls in the system of FIG. 1 will be discussed and described. The network switch 112 may serve a single enterprise location, such as an office building or may serve multiple enterprise sites, possibly located in different cities. The network switch 112 or enterprise server may serve a WLAN hotspot, or multiple WLAN hotspots. It may also serve one or more WLAN coverage areas in private homes that may be connected to the network switch 112 by such means as IP broadband connections. Generally the network switch operates to establish connections between wireless communication units within the WLAN, such as communication unit 101 and various peer communication units. Note that the connection from the wireless communication unit via an access point is a packet data connection and the connection from the peer communication unit will depend on the particulars for the peer unit. For example if the peer communication unit is another static or wireless communication unit within the WLAN or LAN (not shown) the connection will also be a packet data based connection, while if the peer unit is an ordinary phone, such as POTS 109 outside the LAN or WLAN 103 the connection to the wireless LAN is likely a circuit switched voice connection.

The communication network switch 300 comprises a gateway or switching function 303 and a controller or call controller 305 including a B2BUA (back to back user agent, a SIP entity) such as available from Avaya with their MultiVantage product line. Rather than the B2BUA a conventional SIP server can be used. Generally the gateway or switching function operates to couple the wireless LAN and devices therein to the PSTN 107 and thus external phones, such as POTS 109, and other networks, such as the WAN 105. More specifically the switching function is routing traffic or calls between the various devices and networks. The controller 305 is responsible for call control and call signaling and handling on-hold or call waiting calls and handling connections of these calls among particular communications units. The B2BUA is included as part of the controller 305 to facilitate an interface using SIP constructs between the controller and the rest of the LAN including access points, communications units, the switching function 303 and a mobility manager 307.

The mobility manager 307 is included in certain embodiments of the network switch 300 and further often comprises a SIP Proxy and SIP Registrar. The mobility manager 116 operates to facilitate mobility of the wireless communication units within the wireless LAN as well as between networks. This includes facilitating handover activities for active calls and on-hold calls associated with communication units from one to the other network or within the wireless LAN when required. The SIP proxy and SIP Registrar operate according to known techniques to provides a central point or network address that all communication units can contact when they intend to set up a call or connection with another unit. The proxy server/SIP Registrar will have the most up to date network contact or location information for or address, e.g. know where to find, another communication unit or the network switching function 110 in accordance with known techniques. The mobility manager and constituent functions in one or more embodiments can be implemented as software programs running on a general purpose, computing platform such as those available from suppliers, such as Hewlett Packard and Dell, that are suitable for networked operation. The switching function 303, controller 305, and mobility manager 307 are all inter coupled or networked via the LAN as depicted. Note that one or more or all of these entities may be co-located in one or more common computing platforms according to the practitioners desires and thus may be viewed as largely logically distinct entities. The discussions below will be devoted to the respective and relevant functionality and interaction of these respective entities with each other as well as other network entities pursuant to resolving the on-hold call routing and retrieval issues noted above.

The communication network switch 300 as earlier noted is operable to route calls for a first communication network, such as the wireless LAN 103 as well as route such calls to or from other networks, such as the WAN 105. The communication network switch comprises the switching function 303 that is operable to couple the first communication network to a second or other communication networks, via for example the PSTN 107, and thus communication units within such networks. Note that the first communication network and the second communication network comprise a loosely coupled communication network, such as network 100. The communication network switch further comprises the controller 305 that is arranged to control and cooperatively operate with the switching function to connect, via a call leg to the second communication network, an on-hold call in the first communication network to the wireless communication unit after the call leg is established to support a handout of the wireless communication unit to and while the wireless communication unit is operating in the second communication network. Note this call leg may have been established to support a handout of an active or ongoing call with the wireless communication unit 101, when that unit left the wireless LAN 103 and began operation on or within the second network or WAN 105. The communication network switch further includes the mobility manager 307 that as noted above is operable to facilitate mobility of wireless communications units including the wireless communication unit 101 by tracking network contacts (addresses or network location information within the LAN or the WAN) for the wireless communication units, wherein the mobility manager cooperatively with the controller and the switching function is operable to establish the call leg between the second communications network and the first communications network.

In certain embodiments the communication network switch, specifically the controller cooperatively with the switching function is operable to connect the on-hold call by one of i) automatically connecting the on-hold call to the wireless communication unit responsive to, for example disconnecting or placing on-hold an active call and ii) connecting the on-hold call to the wireless communication unit responsive to in-band signaling, such as DTMF feature codes noted above, received by the communication network switch from the wireless communication unit over the call leg. The controller cooperatively with the switching function receives a code, such as a feature code, via the in-band signaling and then responsive to the code, connects an on-hold call, disconnects an active call, or places an active call on-hold. Note that more than one code can be received and more than one of these functions can be performed.

In other embodiments the on-hold call can be a plurality of on-hold calls, such as 2, 3, 4 on-hold calls and the controller cooperatively with the switching function is operable to one of connect, disconnect, and place back on-hold one of the plurality of on-hold calls and to connect a second of the plurality of on-hold calls until all of the plurality of on-hold calls have been disconnected. Typically in this situation the controller cooperatively with the switching function receives unique codes via the in-band signaling, where the unique codes include a code corresponding to each one of the plurality of on-hold calls and thereby indicates to the communication network switch, for example, which of the plurality of on-hold calls should be connected. In still other embodiments, the controller cooperatively with the switching function receives, via the in-band signaling, one, usually a distinct one such as DTMF *0, of the unique codes to indicate that the active call should be disconnected and another one of the unique codes, such as DTMF *5, to indicate that the active call should be placed on-hold.

As noted above with respect to the wireless communication unit, the communication network switch, for example, the call controller 305 or the mobility manager 307 should insure that the communication unit and network switch are referring to the same on-hold call when connecting, disconnecting, etc. Thus the mobility manager or call controller in some embodiments, is further operable to order the plurality of on-hold calls according to a call identifier corresponding to each of the on-hold calls and assign the code corresponding to each of the plurality of on-hold calls according to the resultant order or this order. This allows the first communication network and the wireless communication unit to refer to the same on-hold call with a corresponding unique code. The call identifier can be information such as caller ID or calling party number or other unique call identifier information available to both entities. The communication unit, as a result of previous operation within the wireless LAN 103, where known SIP conventions and constructs will therefore have access via its memory to various such call appearance information.

Referring to FIG. 4 through FIG. 7, ladder diagrams depicting in an exemplary manner the signaling interaction between a wireless communication unit and other entities that may be present or served by the system or network 100 of FIG. 1 will be discussed and described. These diagrams show, by example, various methods or processes of managing, routing, or retrieving calls, such as on-hold calls and active call with the first and second communication networks, where these networks are loosely coupled. These diagrams show in this interactive form the methodologies that are practiced by the various entities, such as the first communication network or wireless LAN 103, more specifically network switch 112, 300, and wireless communication unit 101, 200 and their respective structural and functional elements as discussed earlier. In the FIG. 4 example, a communication unit 401, such as wireless communication unit 200, 101, further identified as user A, mobile station (MS 1) with a wireless LAN or enterprise number E1 and a WAN or cellular number C1 as well as IP address IP1 is depicted and understood to be operating in the WAN 105. Further shown is a PSTN phone 403, designated user E, with an example phone number, such as POTS 109 that can initiate calls via the WAN 105 to units within the WAN, such as communication unit 401. Additionally a network switch for the WAN, specifically an MSC 405 including VLR (visitor location register, which is generally known) that is analogous to the MSC 121 of FIG. 1 is depicted. Generally the entities 401, 403, 405 to the right of the MSC (inclusive) and interactions depicted may be viewed as taking place within or via the WAN 105.

Further shown is the network switch 407 including, for example, the B2BUA (call controller 305) and gateway 301 where the interaction between the network switch 407 and the MSC 405 is understood to be via a PSTN 107. Further shown to the right of the network switch 407 and thus understood to be operating within or through the wireless LAN and network switch 407 are communication units or devices 409, 411, and 413, designated respectively user B, user C, and user D. Note that communications unit xyz and user N xyz will be used interchangeably in the discussions below. Communication unit or user B 409 is a wireless communication unit, e.g. mobile station MS2 with a wireless LAN or enterprise number E2 and WAN or cellular number C2 and IP address IP2. The unit or user C 411 is another PSTN phone, such as POTS 109 with an example phone number that can call units within or route calls through the wireless LAN. Communication unit or user D 413 is a wireless communication unit, e.g. mobile station MS3, with a wireless LAN or enterprise number E3, WAN or cellular number C3, and IP address IP3, where user B and user D are operating in the wireless LAN 103.

At 415 a general description of the initial situation is described. User A or communication unit 401 is engaged in a conversation with user B 409 while user C 411 and user D 413 are on hold. This may the situation after user A 401 has successfully completed a handout to the WAN 105 while an active call with user B was on-going and while user A had calls with user C and user D on hold. Note that the path or call leg 417, within the WAN from user A to the MSC 405, that is supporting the communication or on-going call between user A and user B is a voice path that is likely circuit switched and uses air interface conventions according to the particular known technologies employed within the WAN. The call leg 419 from the MSC to the network switch 407 is also a voice path via the PSTN.

Establishing the call leg 419 from the first communication network to the second communication network as well as the call leg 417 to user A 401 is typically part of effecting or establishing a hand out of the wireless communication unit 401 to the second communication network or WAN 105. The handout of an active or ongoing call can be accomplished in varying manners such as dialing the WAN number C1 from the network switch 407 or dialing a number terminating on or at the network switch 407 from the communication unit 401 while operating on the WAN and appropriately connecting or routing the active call to the new call leg(s) 417, 419. The balance of the path within the wireless LAN supporting the call between user A and user B is a packet data call leg 421 between the network switch 407 and user B 409. The call leg 421 was set up using SIP or similar H.323 conventions and as noted uses known RTP (real time protocol) to support VoIP packet data corresponding to the conversation between user A and user B. The on-hold call with the PSTN phone or user C 411 is depicted as a call leg 423 from the network switch with no voice while the on-hold call with user D 413 is shown as call leg 425 without RTP media. Here-to-fore the on-hold calls would have been disconnected, forwarded to voice mail, or otherwise not been available to user A after a handout to another network. Using the principles and concepts discussed, described and disclosed here this problem for user A has been solved in varying fashions.

At 427 the results of the next few operations are described. Namely user A 401 retrieves the on-hold call with user C 411 and in doing so puts the call with user B on hold. User A via the user interface on communication unit 401 selects the proper on-hold call or line and initiates the retrieval by for example pushing a talk button. This results in connecting, via the call legs 417, 419 to the second communication network, an on-hold call at the first communication network to the wireless communication unit after the handout of the wireless communication unit described above. The signaling path 429 designated by a dotted line represents in-band signaling via the call legs 417, 419 where a feature code, denoted DTMF FC*2 is sent from the communication unit 401 to the network switch 407. The network switch receives and decodes this code or feature code DTMF *2 and responsive thereto places the call with user B on-hold and connects the on-hold call with user C. As shown, user B is placed on hold by sending a SIP INVITE (hold) message 431 to user B and then disconnecting the RTP media 433 from user B. A voice path 435 depicts connecting the on hold call from the PSTN phone or user C 411 with the network switch 407 and thus call legs 419 and 317. Note that user C is a call via the PSTN that is on-hold at the network switch and path 435 amounts to the switch connecting the call leg from user C to the call leg 419 as is known.

At 437 user A via the user interface of communications unit 401 puts the call, now active, with user C on hold by for example pressing a hold button. This is depicted by the dashed signaling path 439 with in-band signaling being used to send a feature code corresponding to placing the active call on-hold, e.g. for example DTMF *5 which is received at the network switch via call legs 417 and 419, decoded, and results in the voice path with user C being put on hold as depicted by 441. AT 443 user A retrieves the on-hold call from user D 413 by selecting the corresponding line and pressing, for example, a talk button. This results in a feature code, for example DTMF *3 being sent over the signaling path 445 (voice call legs 417, 419) and received via the gateway or switching function 301, and decoded by the network switch. Responsive thereto the network switch sends a SIP INVITE message 447 including session descriptive protocol (SDP) via the B2BUA associated with the call controller 305. After known SIP OK and SIP ACK messages (not shown) the RTP connection is made 449 between user D and the network switch and thus connected to the call leg 419, etc.

Figure 4:
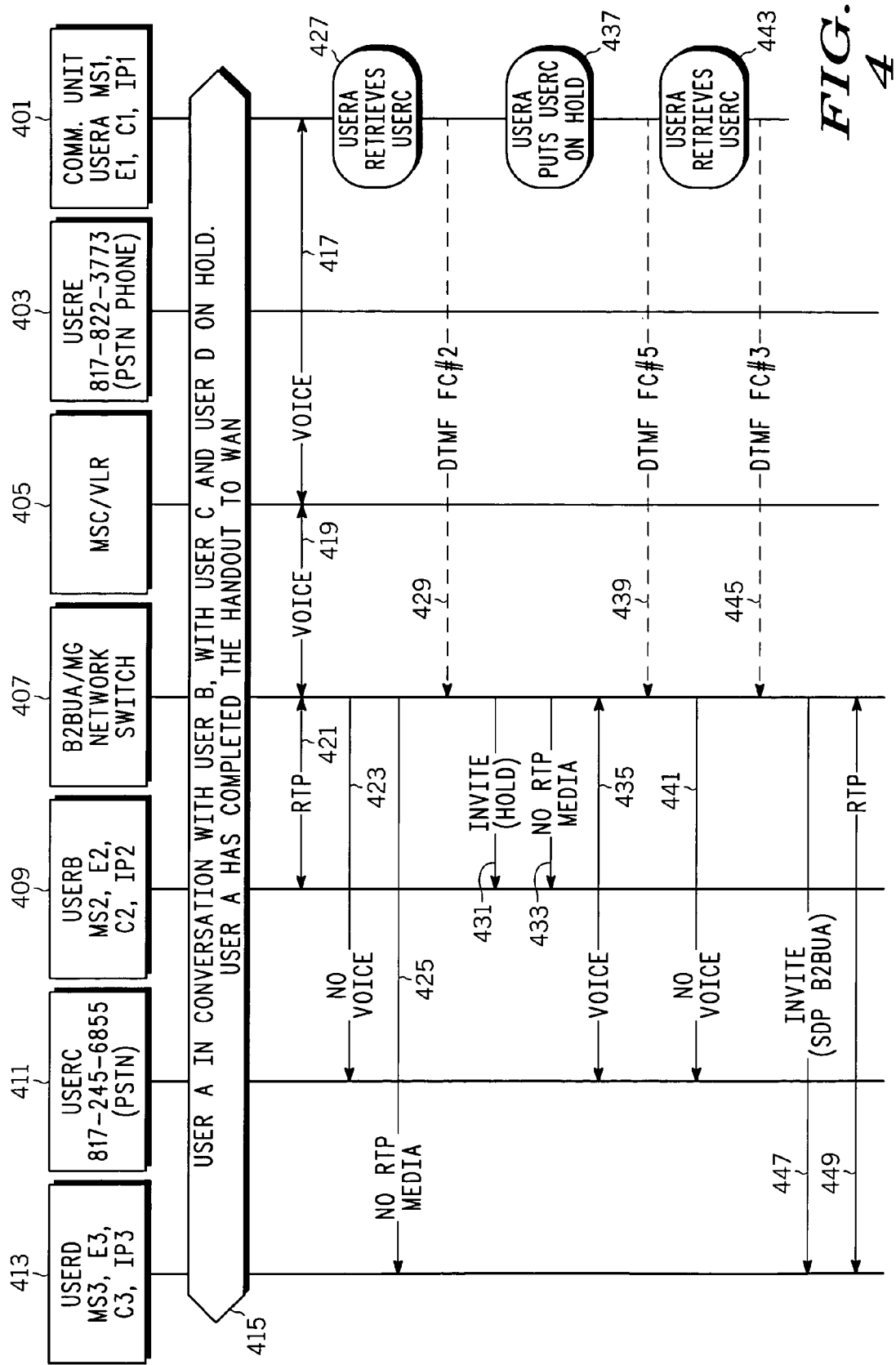
FIG. 4 through FIG. 7 are ladder diagrams depicting in an exemplary manner the signaling interaction between a wireless communication unit, network switch, and other entities that may be present or served by the system of FIG. 1.
Figure 5:
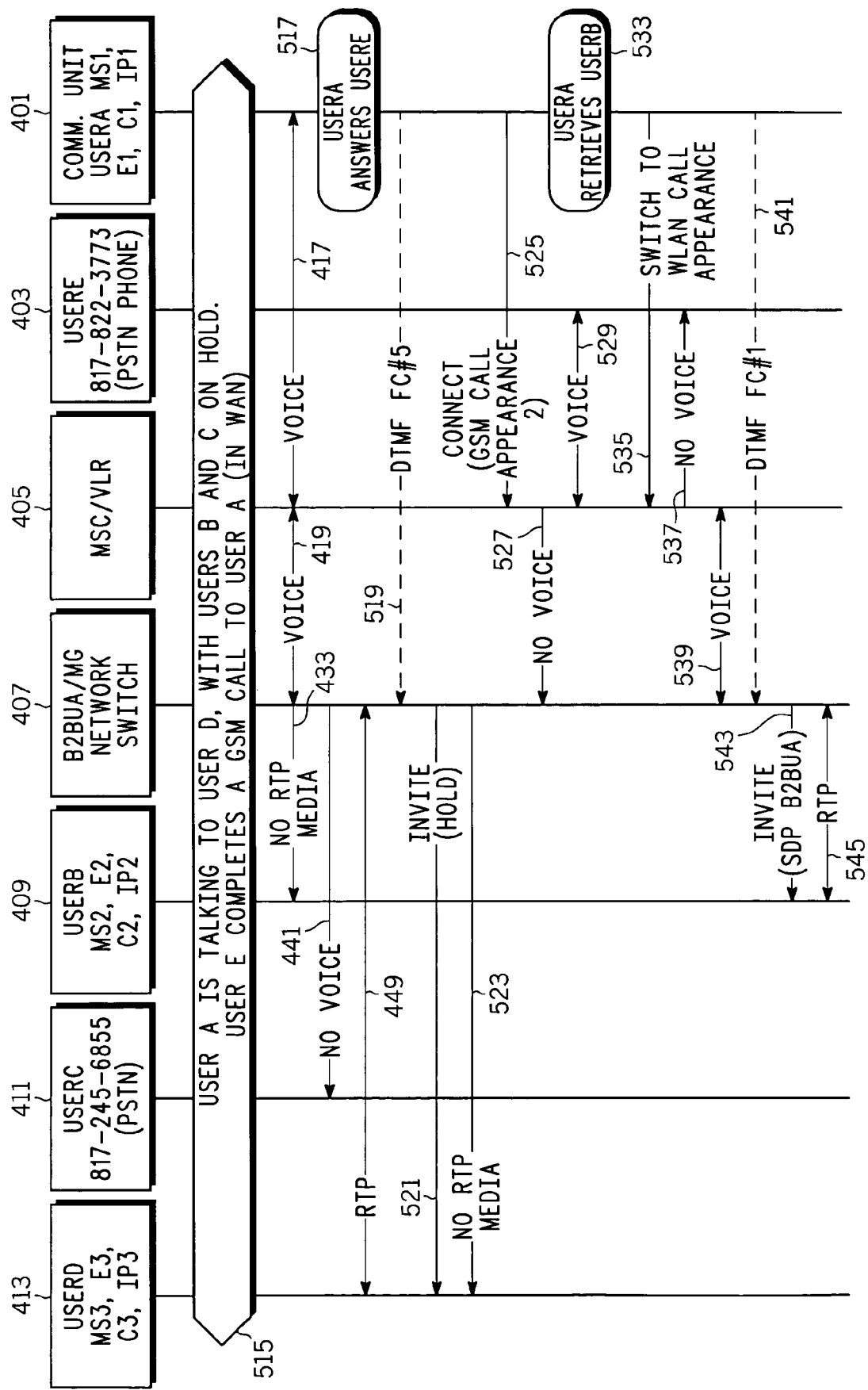

Referring to FIG. 5 where like reference numerals refer to like entities from FIG. 4, 515 describes the initial circumstances to be discussed. User A is engaged in an ongoing call with user D as shown by the call legs 417, 419, 449 and user C and user B are on hold as depicted by 433, 441. User E establishes via the WAN a call with user A. At 517 User A answers the WAN call from user E and user D is put on hold as shown by following interactions. Namely the feature code corresponding to placing the active call on-hold, for example DTMF *5 is sent via in band signaling and when decoded results in the network switch sending a SIP INVITE (hold) message 521 to user D and the RTP media from user D is disabled as shown by 523. Then WAN signaling is used to connect user E, the second call appearance as shown by 525. This places the call leg 417 on hold shown by 527, connects a call leg 529, a voice circuit to user E and routes the conversation with user E to user A via the call leg 417. At 533, user a retrieves from hold the call with user B and user E is put on hold as shown by the succeeding processes. Initially WAN signaling is used to indicate to the MSC that a switch to the wireless LAN call appearance, e.g. call leg 417 is desired. This results in the call leg with user E being placed on hold as shown by 537 and the voice call leg with the network switch 407 being connected as depicted by 539. Once the voice circuit comprising call legs 417 and 419, now 539, have been established a feature code, such as DTMF *1 is sent 541 via in band signaling. This result in sending a SIP INVITE message to user B and removing the RTP call leg from hold at 545, thus retrieving the on-hold call with user B.

Figure 6:
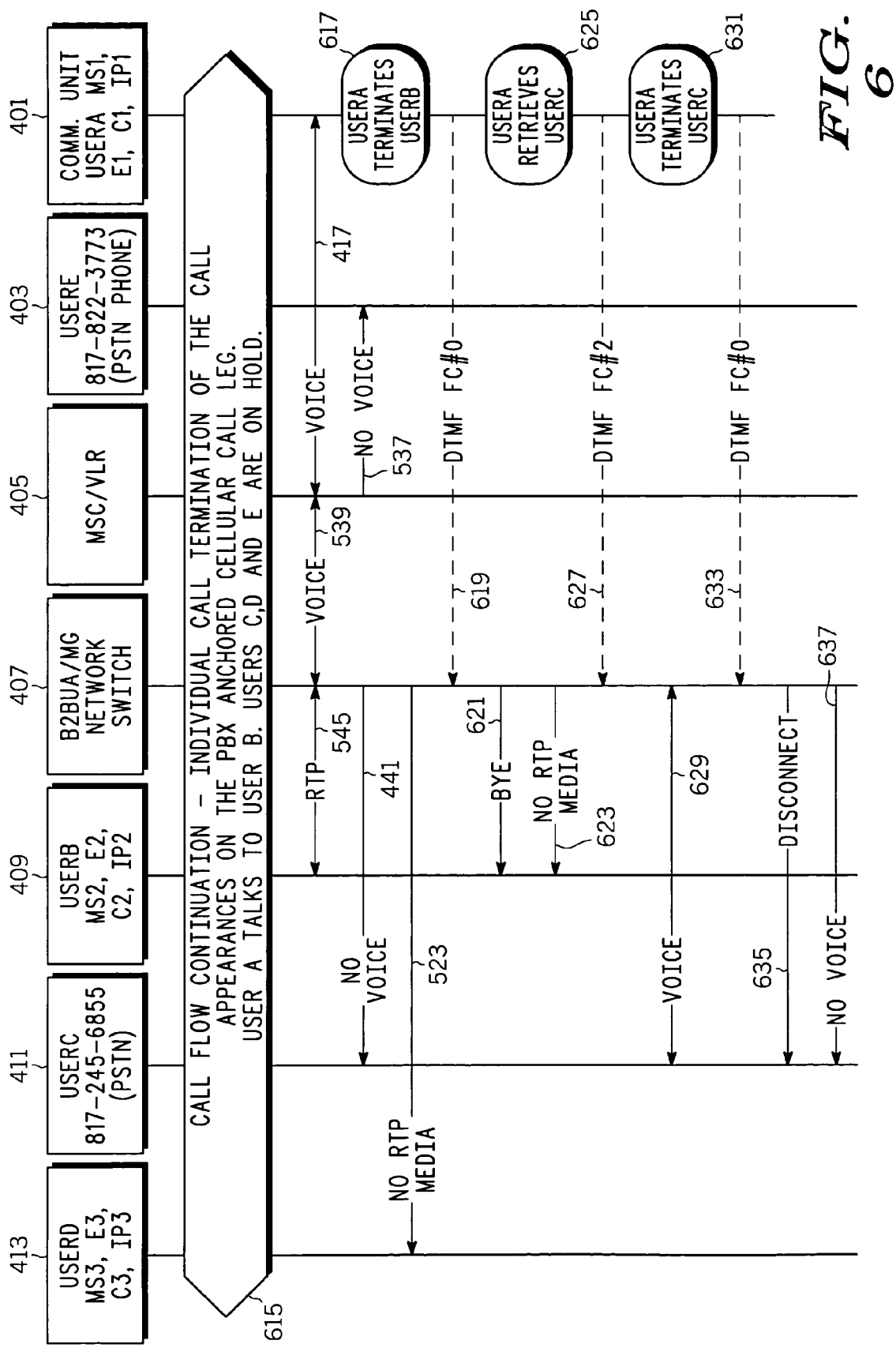
Figure 7:
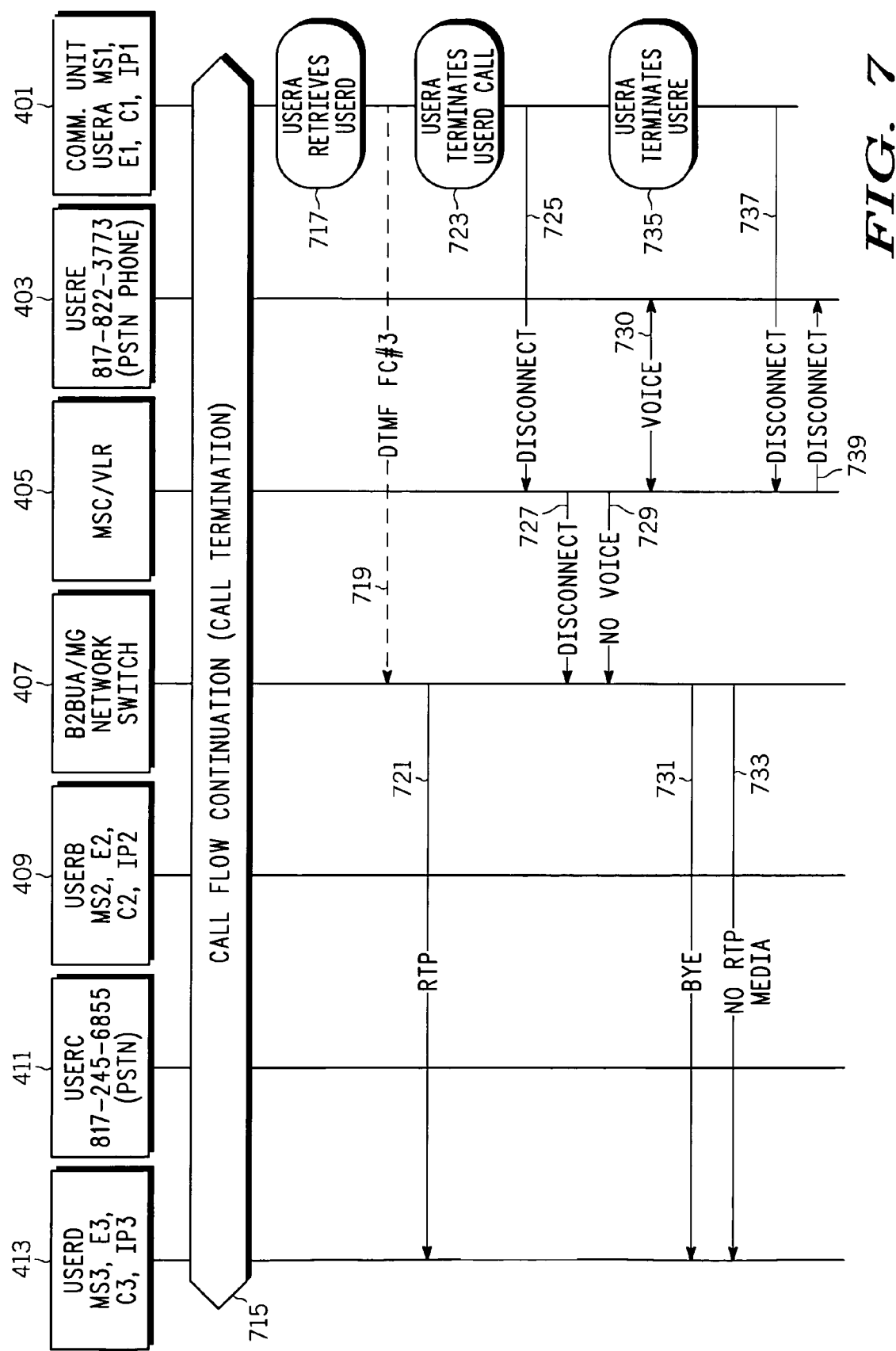

Referring to FIG. 6 where like reference numerals identify like entities from previous figures, the ladder diagram is a continuation of FIG. 5 with the ending state of FIG. 5 reproduced. As the description at 615 indicates user A is in communication with user B (417, 539, 545) with users C, D, and E on hold (441, 523, 537). At 617 user A terminates the call with user B by sending an in band signal or feature code DTMF *0 619 that results in the SIP BYE message 621 and disabling RTP media 623. Then user A retrieves the on hold call with user C depicted by 627 and 629 and terminates this call with user C as shown by 633, 635, and 637. FIG. 7 shows a continuation of the call termination activity as indicated by 715. At 717 user A retrieves user D by sending the appropriate feature code 719 which connects the RTP media 721. At 723 the description shows user A terminating the last on-hold call via the wireless LAN, e.g. call with user D and retrieving the call with user E. In this instance the communication unit 401 sends a known disconnect WAN signal 725 and the MSC sends a disconnect signal 727 via PSTN known trunk signaling and establishes a voice leg 730 with user E. The signal at 727 disconnects the call leg between the wireless LAN and WAN 727, which results in a SIP BYE message 731 to user D and disconnecting the RTP media at 733. Then as indicated at 735, User A terminates the WAN call appearance to user E using WAN signaling 737 to the MSC and the MSC disconnects the leg to user E 739.

The forgoing description of FIG. 4-FIG. 7 has disclosed and discussed methods suitable for implementation within a network switch and corresponding methods for a communication unit to effect retrieval and routing of on-hold calls originating from a wireless LAN while the communication unit operates in a WAN where the LAN and WAN are loosely coupled. For example, connecting the on-hold call to the wireless communication unit over the call leg, responsive to an active call over the call leg being one of disconnected and placed on-hold was discussed. The connecting the on-hold call can further comprise i) automatically connecting the on-hold call responsive to an active call being one of disconnected and placed on-hold and ii) connecting the on-hold call responsive to in-band signaling received over the call leg at the first communication network from the wireless communication unit.

When in band signaling is used the communication unit sends and the network switch receives and decodes a code via the in-band signaling, such as DTMF signaling and responsive to the code, connects an on-hold call, disconnects an active call, and places an active call on-hold. Furthermore when the on-hold call is a plurality of on-hold calls, the method further comprises one of connecting, disconnecting, and placing back on-hold one of the plurality of on-hold calls and connecting a second of the plurality of on-hold calls until all of the plurality of on-hold calls have been disconnected. Additionally the method in some embodiments comprises sending and receiving unique codes via the in-band signaling, where the unique codes include a code corresponding to each one of the plurality of on-hold calls and indicating which of the plurality of on-hold calls should be connected and one of the unique codes indicates that the active call should be disconnected and another one of the unique codes indicates that the active call should be placed on-hold. As noted earlier the communication unit and network switch may need to engage in ordering the plurality of on-hold calls according to a call identifier corresponding to each of the on-hold calls and assigning the code corresponding to each of the plurality of on-hold calls according to the order, thus allowing the first communication network and the wireless communication unit to refer to the same on-hold call with a corresponding unique code.

In this advantageous manner, calls that are on-hold for a communication unit in a first communication network or wireless LAN can be routed to or retrieved and managed by the communication unit when the unit is operating in a second communication network even though the first and second communication networks are only loosely coupled (second network is not aware of the first), concurrent with or after a handover of the communication unit and associated active call from the first to the second communication network. This is in stark contrast to previous practices in similar circumstances where the on-hold calls have been lost to the communication unit through either dropping the on-hold calls or forwarding them to voice mail and thus contributes to increased calling and called party convenience and satisfaction since, for example, the on-hold call will not have to be re-initiated by one of the parties and handling and managing these calls becomes nearly transparent to the particular network that is providing service. It should be noted that the methods and apparatus described above for handling on-hold calls may be implemented with different communication networks than those utilized in the examples above, provided the principles and concepts discussed and disclosed are followed by such networks.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A wireless communication unit arranged and constructed for operation within a loosely coupled communication network comprising a first communication network and a second communication network, the wireless communication unit comprising:

a transceiver configured to support an air interface with the first communication network and with the second communication network; and a controller arranged to control and cooperatively operate with the transceiver to manage and retrieve an on-hold call on the first communication network after a handout of the wireless communication unit from the first communication network to the second communication network via a call leg established to support the on-hold call while the wireless communication unit is operating in the second communication network, wherein the on-hold call is a call placed on-hold when the wireless communication unit is in the first communication network.

2. The wireless communication unit of claim 1 wherein the controller cooperatively with the transceiver is operable to one of disconnect and place on-hold an active call over the call leg and then connect the on-hold call, where the on-hold call is coupled from the first communication network to the wireless communication unit via the second communication network over the call leg.

3. A communication network switch operable to route calls for a first communication network, the communication network switch comprising:

a switching function operable to couple the first communication network to a second communication network, where the first communication network and the second communication network comprise a loosely coupled communication network; and a controller arranged to control and cooperatively operate with the switching function to manage and retrieve an on-hold call on the first communication network after a wireless communication unit is handed out from the first communication network to the second communication network via a call leg established to support the on-hold call while the wireless communication unit is operating in the second communication network, wherein the on-hold call is a call placed on-hold when the wireless communication unit is in the first communication network.

4. The communication network switch of claim 3 further comprising a mobility manager that is operable to facilitate mobility of wireless communications units including the wireless communication unit by tracking network contacts for the wireless communication units, wherein the mobility manager cooperatively with the controller and the switching function is operable to establish the call leg between the second communications network and the first communications network.

* * * * *